March 3, 1942.  R. W. GRIFFIN  2,275,060
TABLE
Filed Jan. 9, 1939
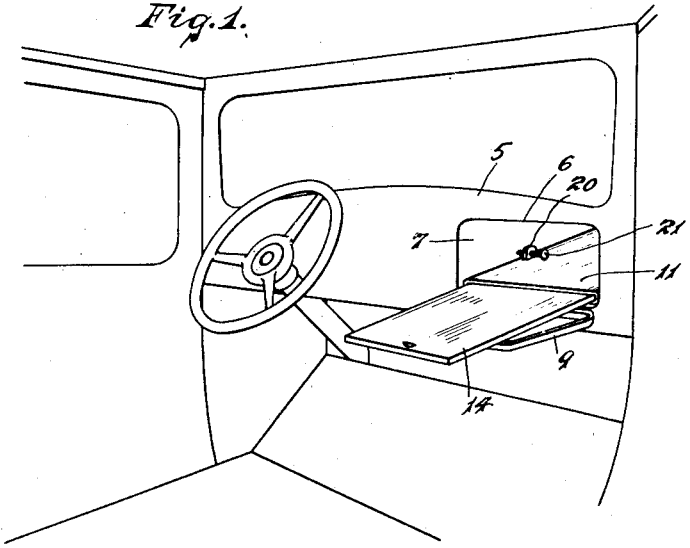
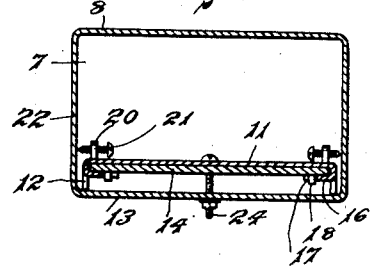
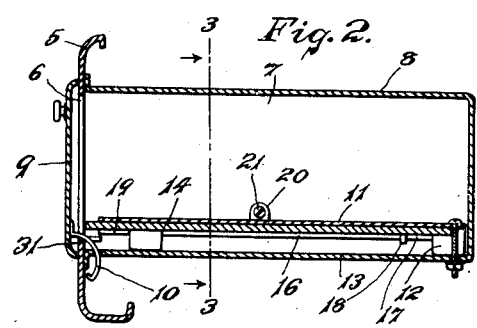
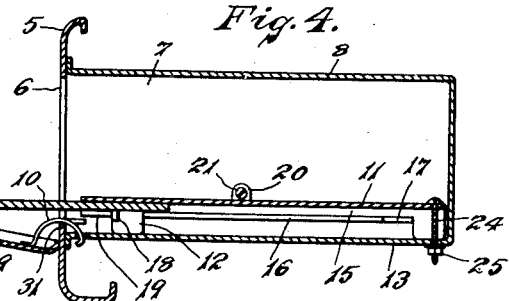
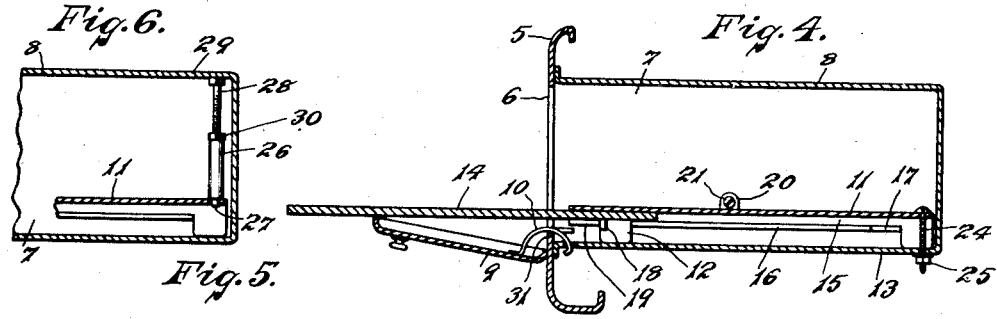
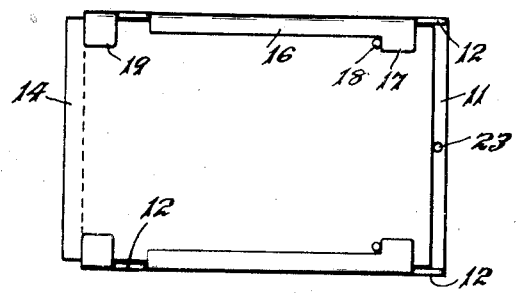
Inventor
RAYMOND W. GRIFFIN.
By
Louis V. Lucia
Attorney Patented Mar. 3, 1942

2,275,060

UNITED STATES PATENT OFFICE 2,275,060

TABLE

Raymond W. Griffin, Hartford, Conn.

Application January 9, 1939, Serial No. 250,080

2 Claims. (Cl. 311—21)

This invention relates to tables and more particularly to such as are adapted for use in automobiles, aeroplanes, and the like.

An object of my invention is to provide a table that, when not in use, may be stored entirely within the usual storage compartment in the dashboard of a vehicle.

A further object of the invention is to provide a table which is contained in such a compartment without interfering with other articles therein.

A further object of the invention is to provide a device comprising a table and which may be readily installed in compartments of different sizes.

Further objects will be readily understood from the following description and from the drawing in which:

Figure 1 is a perspective view showing the interior of the front part of an automobile with my improved table installed in the compartment of the dashboard thereof.

Figure 2 is a side view, in longitudinal section, through the said compartment.

Figure 3 is a front view, in cross section, through said compartment on line 3—3 of Figure 2.

Figure 4 is a view similar to Figure 2 but showing my improved table withdrawn from the interior of the compartment and in position for use.

Figure 5 is a bottom view of the device comprising my improved table.

Figure 6 is a fragmentary view, in longitudinal section, through the compartment showing a modified form of means for securing the device within said compartment.

As illustrated in the drawing, the numeral 5 denotes a dashboard of a vehicle having an opening 6 which communicates with the usual compartment 7 that is formed by means of a casing 8 mounted to the back of the dashboard.

A door 9, for closing said compartment, is hinged to the dashboard by means of a conventional form of a hinge 10.

In the form illustrated; the device comprising my improved table consists of a plate 11 having legs 12 for supporting the same on the floor 13 of the compartment. The table 14 is mounted underneath said plate 11 and is slidable in grooves 15 which are formed by side portions 16 that are bent downwardly and inwardly from the plate 11 to provide flanges for supporting the said table 14.

As shown in Figure 5, the said supporting flanges are provided with extensions 17 forming stops which engage the stop pins 18, mounted on the bottom of the table 14, to limit the rearward movement of said table. Flanges 19 are also provided at the front end of the plates 11 to provide further support for said table when in "pulled-out" position and also to engage the stop pins 18 and limit the forward movement of the table.

A threaded post 20 is provided at each side of said plate 11, and a pointed screw 21 is threaded through each of said posts to be turned into engagement with the side walls 22 of the compartment 6 so as to center the plate 11 therein and at the same time secure it against vertical movement in said compartment.

Since the casing 8 of the compartment is sometimes constructed of a material which does not have sufficient strength to permit securing of the plate 11 within the compartment solely by the screws 21, an opening 23 is provided adjacent to the rear edge of the plate 11 so that a bolt 24 may be used to anchor the said plate to the floor 13 of the compartment. In such cases, it being necessary to drill a hole in the floor of the compartment so that the said bolt may be inserted therethrough and fastened by means of a nut 25.

In order to eliminate the necessity of drilling said hole through the bottom of the compartment, I may, if desired, provide fastening means such as illustrated in Figure 6 of the drawing; said means comprising a hollow post 26 having a point 27, which is insertable within the aperture 23, and a threaded bolt 28 which extends from said post and is adapted to engage the top 29 of the compartment. A nut 30 is threaded to said bolt and turned against the post so as to force the bolt against the top of the compartment and thereby clamp the plate 11 with the legs 12 thereof against the bottom of the compartment.

It will be readily understood that where the screws 21 cannot solely be used for fastening the device within the compartment, they will serve as positioning means for the plate, to prevent side movement thereof, and the said plate may be fastened by either the bolt 24 or the fastening means illustrated in Figure 6.

In some automobiles, it is common to find that the bottom edge of the opening 6 in the dashboard extends above the floor of the compartment, as clearly illustrated at 31. My improved device provides for such conditions by means of the legs 12 which support the table 14 at a distance spaced from the bottom of the compartment and on a plane higher than the said extending edge of the opening, thereby permitting the said table to be pulled out of the compartment over the said edge without interference therefrom.

By means of the plate 11, a false floor is provided for the compartment on which will rest articles placed therein without interfering, in any manner, with the operation of the table 14. It will, therefore, be readily seen from the embodiment illustrated in the drawing that I have provided an improved table which may be mounted within a compartment and which, when not in use, is entirely stored within said compartment and concealed by the door thereof without affecting the use of the compartment nor the operation of said door.

When said table is to be pulled out for use, it is simply necessary to open the door of the compartment and pull the table out over the said door. While the table is in its outward position, the door will rest under it, as clearly illustrated in Figure 4 of the drawing.

If desired, the plate 11 may be fastened directly to the walls of the compartment and spaced from the floor 13, by suitable means, without the use of the legs 12 so that the said plate will still position the table over the edge 31 of the opening 6 and also provide a floor for supporting articles within the compartment. It is, therefore, desired to have it understood that while I have illustrated only one embodiment of my invention, the same may be modified to a greater or lesser extent without departing from the scope of my invention as set forth in the following claims.

I claim:

1. A device of the character described adapted to be contained within a compartment; said device comprising a plate having legs for supporting said plate upon the floor of said compartment, flanges bent inwardly from the edges of saidp late to provide grooves thereunder, a table slidably mounted in said grooves, extensions on said flanges, stop means on said table adapted to engage said extensions and thereby limit the movement of said table in said grooves, and means for securing said plate in position within said compartment.

2. A device of the character described comprising a plate having portions thereof bent perpendicular thereto to provide legs for supporting said plate upon the floor of a compartment, portions bent perpendicular to said legs and parallel to said plate to provide grooves under said plate, a table slidably supported in said grooves, a vertical post on said plate and means threaded to said posts for engaging the walls of the compartment to secure and position said plate therein.

RAYMOND W. GRIFFIN.